United States Patent [19]
Copeland et al.

[11] Patent Number: 5,872,969
[45] Date of Patent: Feb. 16, 1999

[54] SYSTEM AND METHOD FOR EFFICIENTLY SYNCHRONIZING CACHE AND PERSISTENT DATA IN AN OBJECT ORIENTED TRANSACTION PROCESSING SYSTEM

[75] Inventors: George Prentice Copeland, Austin, Tex.; Simon Anthony James Holdsworth, Andover, England; Stanley Alan Smith, Austin, Tex.

[73] Assignee: International Business Machines Corporation, Armonk, N.Y.

[21] Appl. No.: 494,049

[22] Filed: Jun. 23, 1995

[51] Int. Cl.$^6$ .................................................. G06F 17/30
[52] U.S. Cl. ................................................................ 395/671
[58] Field of Search .................................. 395/671, 674; 707/10, 9, 8, 103

[56] References Cited

U.S. PATENT DOCUMENTS

| | | |
|---|---|---|
| 5,592,664 | 1/1997 | Starkey . |
| 5,721,825 | 2/1998 | Lawson et al. . |
| 5,727,203 | 3/1998 | Hapner et al. . |

OTHER PUBLICATIONS

*Distributed Transaction Processing: The XA Specification*, CAE Specification, Dec. 1991, X/Open Company Limited, pp. 1–80.

*Object Transaction Service*, Aug. 4, 1994, Object Management Group, Inc., pp. 1–103.

*The Common Object Request Broker: Architecture and Specification*, No. 91.12.1, Revision 1.1, Dec. 1991, pp. 13–44.

*X/Open distributed Transaction Processing (DTP)*, X/Open CAE Specification, Sep. 19, 1991, pp. 1–42.

*Primary Examiner*—Alvin E. Oberley
*Assistant Examiner*—Sue Lao
*Attorney, Agent, or Firm*—Mark S. Walker

[57] ABSTRACT

A system and method for effectively synchronizing data in an object oriented distributed transaction processing system employing a multilevel data store. Each object that maintains first-level volatile data registers as a synchronization object if unsynchronized changes to that data exist. A register object at each node tracks synchronized objects registered for that node. Each registered synchronization object, in turn, registers with its superior node when registered synchronization objects are present. A hierarchy of registered synchronization objects and synchronization objects is thereby created. The transaction termination process transmits a pre-prepare message to the registered synchronization hierarchy providing each synchronization object an opportunity to flush its data to the second-level persistent data store. The hierarchical structure of registered objects ensures that the minimum number of messages are transmitted over the network.

1 Claim, 8 Drawing Sheets

SYSTEM AND METHOD FOR EFFICIENTLY SYNCHRONIZING CACHE AND PERSISTENT DATA IN AN OBJECT ORIENTED TRANSACTION PROCESSING SYSTEM

CROSS-REFERENCE TO RELATED APPLICATIONS

This invention relates to application Ser. No. 08/307,212, entitled, "A System for Building Optimal Commit Trees in a Distributed Transaction Processing System," filed Sep. 16, 1994 bearing attorney docket number AT994-117.

BACKGROUND OF THE INVENTION

1. Field of the Invention

The present invention relates generally to a system and method for managing a dual-level data storage system in a transaction processing system. More particularly, the present invention relates to synchronization of a volatile data cache with a persistent data store. Still more particularly, the invention relates to the management of data in a distributed object oriented transaction processing system where object data is maintained in a volatile cache and periodically committed to a persistent data store.

2. Background and Related Art

Computer implemented transaction processing systems are used for critical business tasks in a number of industries. A transaction defines a single unit of work that must be either fully completed or fully purged without action. For example, in the case of a bank automated teller machine (ATM) from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and actual occurrences.

Distributed transaction processing involves a transaction that affects resources at more than one physical or logical location. In the above example, an ATM transaction affects resources managed at the local ATM device as well as bank balances managed by a bank's main computer. A distributed transaction may not be physically distributed but may involve cooperating tasks that must be completed in synchrony for successful transaction completion.

The X/Open Company Limited has promulgated a guide that describes one model for implementing distributed transaction processing. The *X/Open Guide, Distributed Transaction Processing Reference Model*, October 1991, discusses the components of a distributed transaction system and the interrelationships between them. The X/Open Distributed Transaction Processing Model (the DTP Model) describes three main components: an Application Program(AP), a Transaction Manager (TM), and one or more Resource Managers (RMs). The Application Program uses and modifies the resources controlled by one or more of the Resource Managers. The Transaction Manager is responsible for global transactions and coordinates the decision whether to commit or rollback the actions taken by the Resource Managers. (Commit causes the resources to be updated while rollback causes all work to be discarded returning the resources to the state they were in upon transaction initiation.) The Resource Managers manage specific resources. Resource managers may include a database management system (DBMS), a file system, or similar resource.

Object oriented programming systems are designed to increase the efficiency of program development by enabling object reuse and simplifying system maintenance through clear separation of function. Each object in an object oriented system encapsulates the data for that object and the procedures or methods for operating on that data. Encapsulation means that the data for an object can be manipulated only by that object using the defined methods. Object oriented systems also implement object inheritance. Inheritance allows a more specific object to be derived from a general object. The more specific object can "inherit" all of the data and methods of the parent object, but can override selected data and methods and add others to implement its unique function.

The application of object oriented techniques to transaction processing systems raises many new issues but offers opportunities to increase system efficiency through the use of object oriented principles. The Object Management Group, Inc. (OMG) has established standards for interoperable object oriented systems. The overall architecture defined by OMG is the Common Object Request Broker Architecture (CORBA). CORBA defines the interactions between objects, and in particular, between distributed objects in different computer systems. OMG has accepted submission of a proposal to standardize transaction processing in object oriented systems. This submission, entitled the *Object Transaction Service(OTS)*, sets forth the requirements for object services necessary to implement a transaction processing system. The OTS specification uses many of the unique capabilities of object oriented systems. The OTS model, however, is designed to be interoperable with the X/Open DTP model and with existing procedural transaction processing systems.

The X/Open DTP model describes and many commercial transaction processing systems use a "two phase commit" to decide whether or not to commit the changes made by a transaction. The first phase involves the transaction manager determining whether each of the resource managers believes it is able to successfully commit the changes made by the transaction. If any resource manager indicates that it cannot, or fails to respond, the transaction manager causes the changes to be rolled back in each resource manager. If all of the responses are positive, then the transaction manager orders all of the resource managers to commit the transaction.

Object oriented systems frequently are implemented using a dual storage model for storing data. The dual storage model uses a first level of persistent storage, such as hard disk, non-volatile memory, or read/write CD-ROM to maintain permanent data. The permanent data in a transaction processing system is maintained by a resource manager such as a database management system(DBMS.) A second level of volatile data storage exists in association with each of the objects. This second level, volatile data is more rapidly accessed by the application through the available object methods. The data at this second level is frequently referred to as "cached data."

Object data that is added or changed in the system by changing the cached data, must eventually be migrated to persistent storage. Data migration can occur through various algorithms such as periodic flushing of the data cache or explicit program instruction to write the data to persistent storage. Flushing the data to persistent storage consumes considerable system resource and efficient system design requires that object data cache flushes be minimized.

Distributed transaction processing systems, such as that discussed in the present application, present unique problems to a dual storage system. Flushing of the data to the persistent storage results in an update of that storage. The persistent data storage frequently is managed in a transaction processing system by a resource manager as discussed above. The resource manager controls updates to data including the commit/rollback processing. Once data for a particular transaction has completed termination ("commit" or "rollback") processing for that resource manager, the resource manager will not accept additional data from that transaction for updating the persistent store. If volatile data remains in an object data store, that data will be lost because normal cache migration to persistent storage will be refused by the resource manager.

Procedural transaction processing systems (those that are not object-oriented) have addressed this problem of coordinating changes to underlying data stores during transaction completion. The solution for procedural systems is significantly easier than that required for object oriented systems due to the static nature of the procedural system commit tree. The commit tree is used by the system during the two-phase commit process. Prepare and commit messages are sent from the transaction manager and transmitted to each element of the tree following the tree hierarchy. The commit tree in a procedural system is always built with the persistent data storage at the bottom of the tree. This static commit tree ensures that the commit requests are received by upper level resources (volatile storage) before they are received by the underlying persistent resource manager. This allows the cache to flush the contents of volatile storage into the persistent resource manager when the transaction is ended, because the cache is guaranteed to be committed before the resource manager.

Procedural transaction processing systems also tend to have the transaction manager, the cached data, and the underlying resource manager co-located on the same physical computer system. Co-location has allowed for the alternate cache synchronization solution of notifying all data storage "objects" of the impending data commitment or rollback so that each can flush cached data. This approach is much less satisfactory, however, where a distributed transaction processing system is implemented. Warning all objects in a distributed transaction processing system is not practical due to the communication costs associated with sending each distributed object a message and the resultant loss of performance.

Distributed object-oriented systems pose special problems not found in traditional procedural transaction processing systems. The dynamic structure of the commit tree in object based systems contributes to these special problems. The objects involved in a transaction, and hence needing to be in the commit tree, change dynamically based on the flow of messages for a particular transaction instance. While this dynamic structure of objects is desirable since it provides tremendous programming flexibility, it does not guarantee a commit structure that has the underlying persistent data store (resource manager) at the bottom of the tree. By failing to ensure this relationship, the situation could exist where the persistent data store receives a commit or rollback request before a volatile object that contains data meant to be flushed to this persistent data store. In this situation, the cache cannot be flushed into the persistent resource manager as the resource manager considers the transaction complete.

An alternate solution to the dual-level storage problem is to use a single-level storage model instead. The IBM OS/400 operating system and the Object Design Inc. system implement single level stores. In these systems the storage is managed so that writing to volatile storage is guaranteed to result in writing to persistent store regardless of transaction activity.

The technical problem therefore exists to implement a distributed transaction processing system that is able to efficiently ensure that all cached object data is flushed to persistent storage before transactions are committed.

The technical problem includes a need to implement a distributed transaction processing system that causes object data cache warning messages to be sent only to those objects that have volatile data that could be affected by the transaction, and, that causes exactly one cache synchronization message to be sent to each distributed node that contains one or more objects requiring data synchronization. The cache synchronization message flows must complete before commit messages are sent. Responsibility for flushing data must reside with the objects maintaining the data rather than with the client application.

SUMMARY OF THE INVENTION

The present invention is directed to a distributed object oriented transaction processing system that solves the technical problems described above. In particular, the present invention is directed to a system and method for determining the objects that require synchronization messages prior to transaction termination (commitment or rollback.) The system and method ensure that a minimum number of messages are sent by building a synchronization object tree comprising registered synchronization objects for each processing node requesting involvement in the pre-prepare process for each object and synchronization objects having changed data. Pre-prepare synchronization messages warning of transaction termination are sent by the termination object to each registered synchronization object. The registered synchronization object can be either an object with data to be flushed or a coordinator synchronization object on another node that in turn sends a message to each synchronization object in that node. In an alternate embodiment, a second message is sent to the synchronization tree indicating success or failure of the termination processing.

More specifically, the present system for synchronizing transaction processing object data with permanent data in a computer system having a processing node with processor means, memory and permanent storage means, comprises: termination means for controlling transaction processing transaction termination; means for registering with the termination means an object having data requiring synchronization before transaction completion; and means for notifying only registered objects before transaction commitment begins.

It is therefore an object of the present invention to trigger object data synchronization by sending a minimum number of messages to objects having unsynchronized data.

It is another object of the present invention to manage the synchronization process across multiple, distributed processing nodes by creating an object hierarchy of synchronization objects.

It is yet another object of the present invention to create a minimal synchronization hierarchy by registering only those synchronization objects that would be impacted by a failure to synchronize.

It is yet another object of the invention to implement a process for transaction termination that assures that all volatile data is synchronized with the data store before the data store updates are committed or rolled back.

It is still another object of the invention to implement a process that causes the object maintaining data to be responsible for synchronizing that data without a client request to do so.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
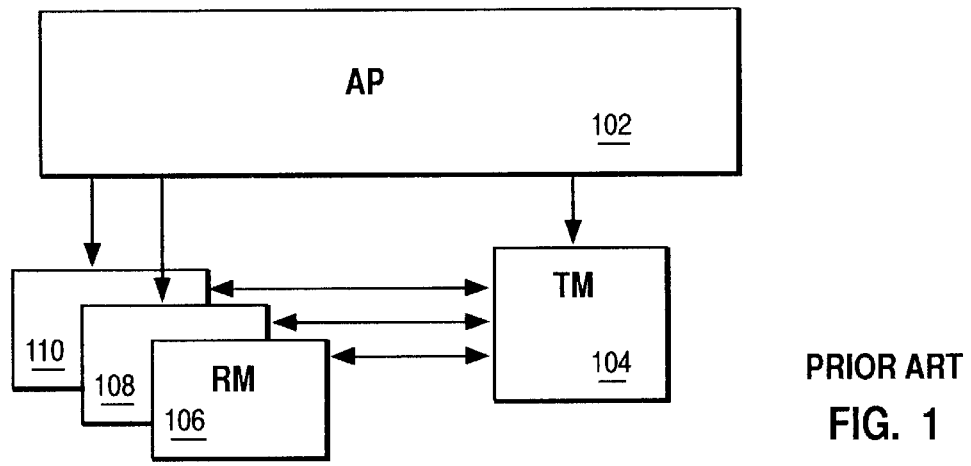
FIG. 1 is a block diagram illustrating the X/Open Distributed Transaction Processing Model.

The X/Open Distributed Transaction Processing (DTP) model is shown generally in FIG. 1. An Application Program 102 executes and causes data or other resources to change state. Resources are managed by a Resource Managers 106 108 110, each of which can be a database management system (DBMS), file management system or similar system. The Resource Managers may be distributed on computer systems remote from the system executing the Application Program 102 or they may be implemented as separate processes within the same computer system. Transaction Manager 104 controls the completion of processing for each particular transaction initiated by Application Program 102. Transaction Manager 104 coordinates the actions of the Resource Managers to ensure that all resources are in a consistent state at the end of the transaction. This coordination ensures that the transaction appears to operate atomically, i.e., the transaction changes either all resources associated with the transaction or it changes none of them.

Figure 2:
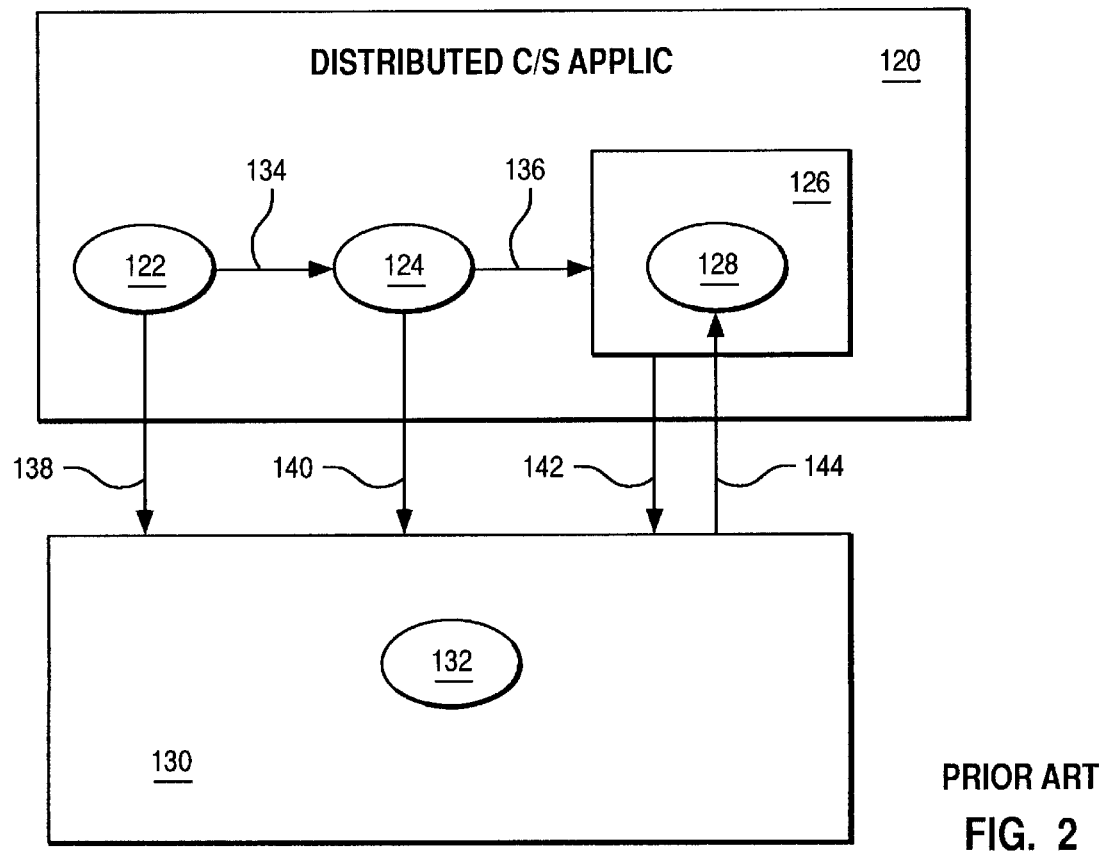
FIG. 2 is block diagram illustrating the OMG Object Transaction Services model.

The Object Transaction Services model defined by the Object Management Group is shown generally in FIG. 2. A distributed client/server (C/S) application is shown at 120. The application 120 comprises a number of objects that exchange messages to accomplish the actions required by the transaction. The objects present in the application include one or more Transactional Clients 122 that invoke operations of transactional objects. The object that begins a transaction is the transaction originator and the originator sends a message 138 to the Transactional Service at the beginning and end of a transaction. A transactional object is an object whose behavior is affected by being invoked within the scope of a transaction. A transactional object typically contains or refers to persistent data that can be modified by transactional requests. Persistent data is that data that will survive a system restart. Persistent data typically resides on disk storage devices, non-volatile memory or similar devices.

Transactional objects are used to implement two types of application servers: a transactional server 124 and a recoverable server 126. A recoverable server implements protocols necessary to ensure that all participants in the transaction agree on the outcome, either to commit the transaction or rollback the transaction, and to be able to recover from failure. A recoverable object is a transactional object, but not all transactional objects are recoverable. Non-recoverable transactional objects may implement their state using some other recoverable object.

A recoverable object must participate in Transaction Service 130 protocols. Transaction Services 130 maintain certain data defining the scope of each transaction as transaction context 132. The transaction context 132 is associated with each ORB-aware thread (Object Request Broker (ORB) characteristics are defined by the OMG CORBA architecture.) The transaction context 132 is submitted with each request generated from the client application and is used to define operational environment characteristics where the request is processed. Contents of the transaction context 132 can include a reference to the transaction coordinator, ancestor references for nested transactions, a globally unique transaction id for the transaction coordinator and implementation specific data understood by the subordinate transaction coordinator.

Recoverable objects participate in Transaction Services 130 by registering a Resource 128 with the Transaction Service. The Transaction Service 130 drives the commit protocol (the two phase commit) by contacting those resources registered for a transaction.

A transactional server 124 is a collection of one or more objects whose behavior is affected by the transaction but have no recoverable states of their own. A transactional server implements transactional changes using other recoverable objects. A transactional server does not participate in the completion of the transaction but can force the transaction to be rolled back by sending a roll back message 140.

A recoverable server 126 is a collection of objects, at least one of which is recoverable. A recoverable server participates in the protocols by registering one or more Resource objects 128 with the Transaction Service using a Registration message 142. The Transaction Service drives the commit protocol by issuing requests 144 to the resources registered for a transaction.

Figure 3:
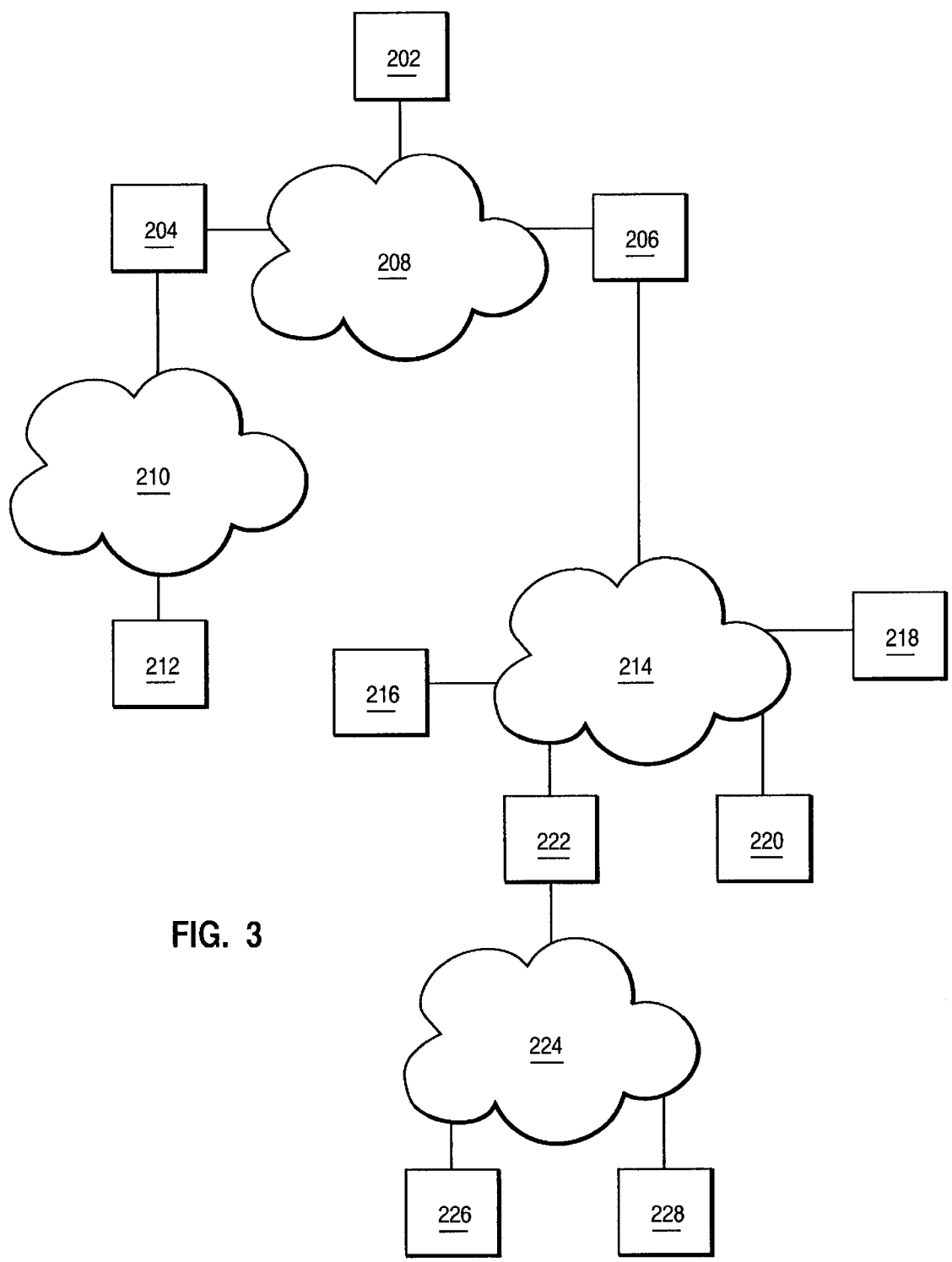
FIG. 3 is a block diagram illustrating a system of distributed computers interconnected by networks in which the preferred embodiment of the present invention is applied.

An example of a distributed processing system according to the present invention is shown generally in FIG. 3. Several computer systems are interconnecting using communication networks. For example, systems 212 and 204 are connected by network 210. Systems 204, 202, and 206 by network 208. Systems 206, 216, 218, 220, and 222 by network 214 and systems 222, 226, and 228 by network 224. The networks can be any known local area network (LAN) or wide area network (WAN), including token ring, Ethernet or other network. The "network" can also be the communication bus between multiple processes in a single computer system.

Figure 4:
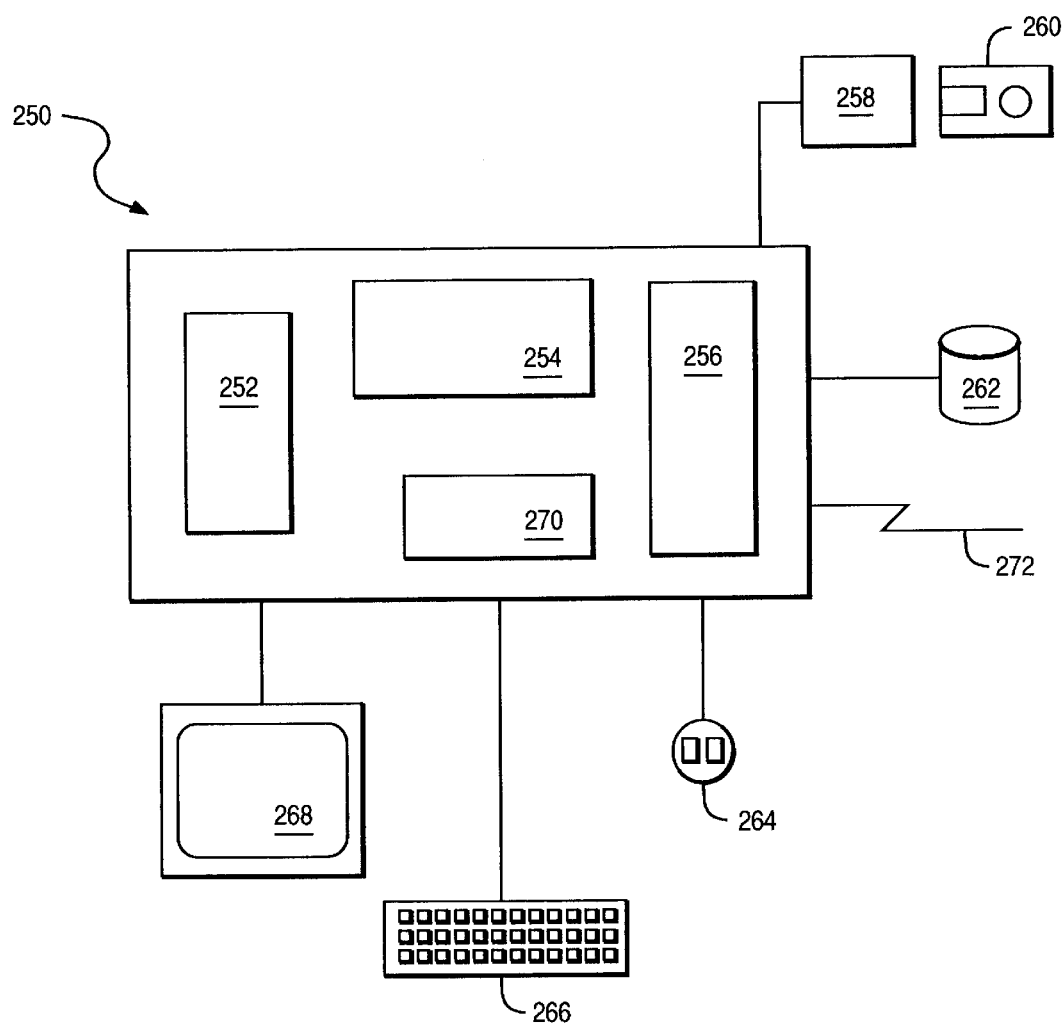
FIG. 4 is a diagram of a computer system incorporating the preferred embodiment of the present invention.

A typical computer system for practicing the present invention is shown in FIG. 4. Each system 250 contains one or more central processing units 252, volatile memory 254, and input/output controller 256. The input/output controller 256 manages reading from and writing to magnetic or optical disk storage 262, removable storage 258, 260 and to display 268, keyboard 266 and pointing device 264. System communication controller 270 manages communications with a network via communication link 272. This configuration is provided for exemplary purposes only and is not intended to be limiting. Some commercially available computer systems such as the IBM PS/2 computer and IBM RISC System/6000 workstation are examples of the types of systems on which the invention may be practiced. (PS/2 and RISC System/6000 are trademarks of the IBM Corporation.) As discussed above, the systems of a distributed environment may all be linked via a single communications bus sharing memory and disk storage.

Computer system 250 is controlled by an operating system such as the OS/2 operating system, or the AIX operating system (OS/2 and AIX are trademarks of the IBM Corporation.) Network communications may be managed by a network operating system such as Novell NetWare operating system, or the IBM LAN Server operating system.

The present invention is practiced using a program embodied in a computer readable media or suitable hardware to control a computer system such as those described above.

Figure 5:
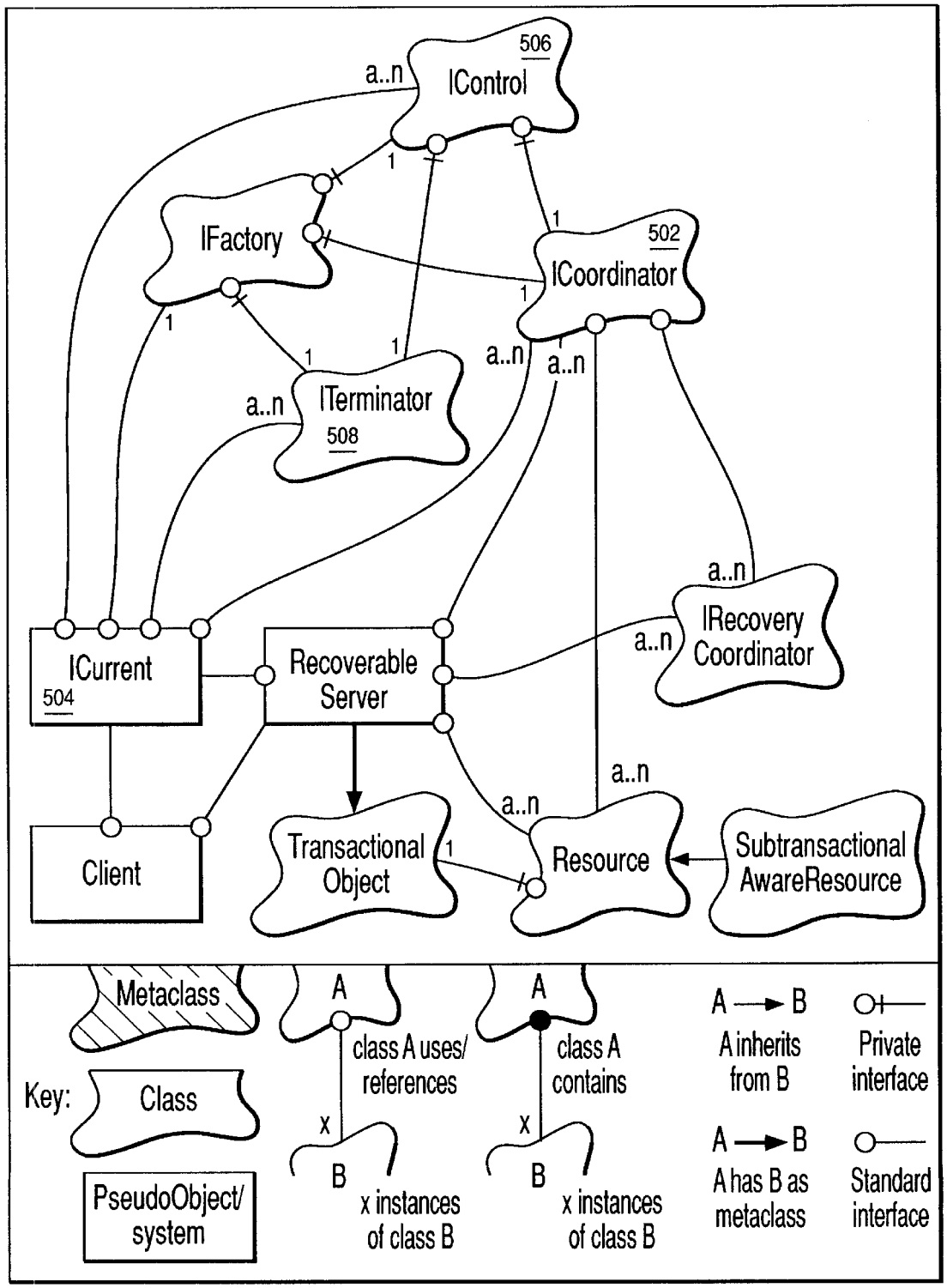
FIG. 5 is an object diagram depicting the classes defined in the OMG Object Transaction Services specification.

The present invention is implemented by adding objects to the OMG classes defined in the OMG Object Transaction Services specification. The additional objects implement a novel process and structure for managing the synchronization of dual-level stores. The preferred embodiment employs an OMG implementation as shown in FIG. 5. Each OMG defined class, e.g., "Factory," is implemented specifically as, e.g., "IFactory." This structure allows flexibility in changing the actual implementation regardless of changes to the OMG specification.

Figure 6:
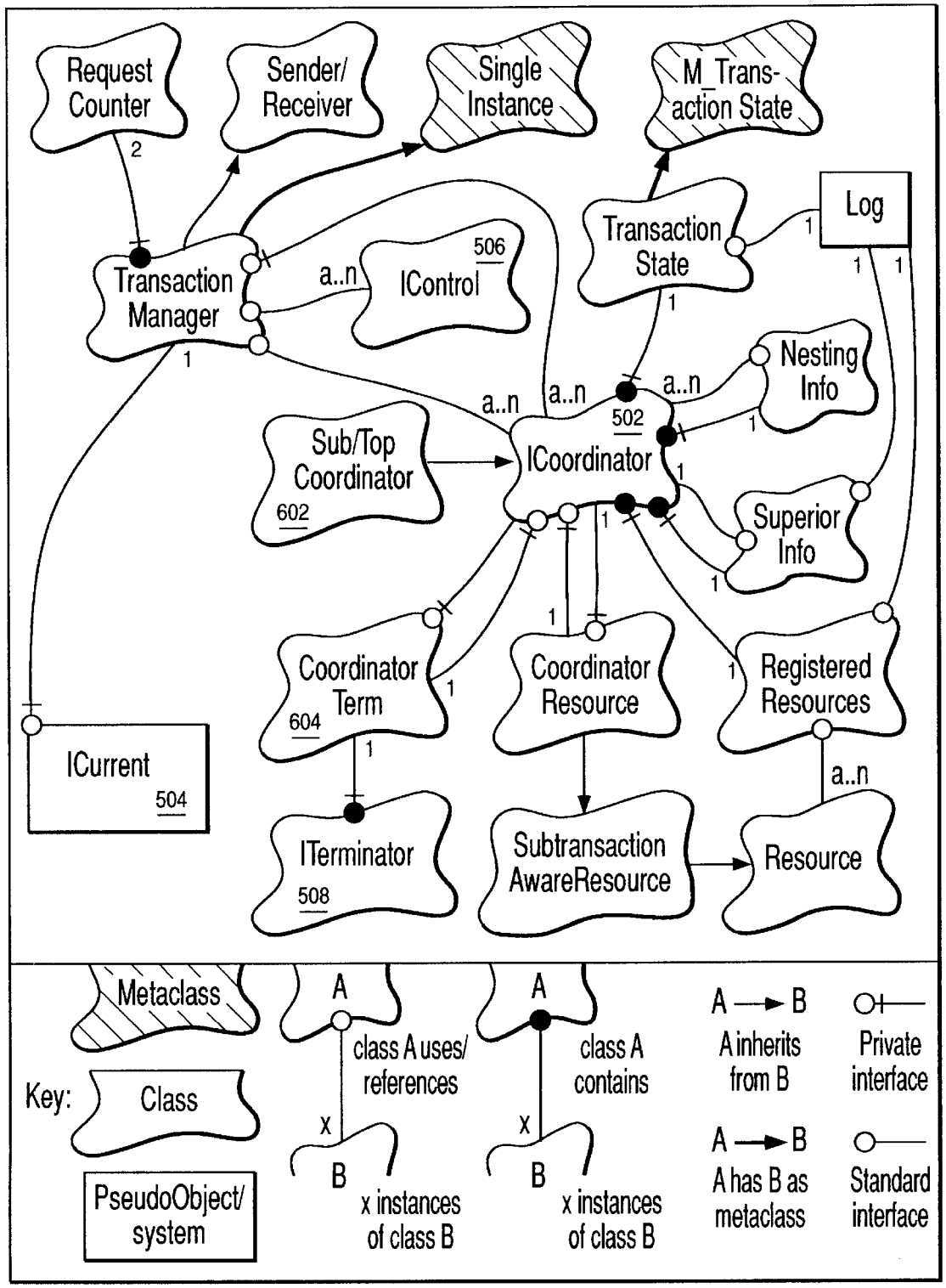
FIG. 6 is an object diagram depicting the implementation classes according to the present invention that support Object Transaction Services.

FIG. 6 illustrates the implementation classes added to the specific OMG classes to perform transaction processing functions. These implementation classes (those without an initial "I") provide functions used by the OMG classes to carry out the transaction processing.

Figure 7:
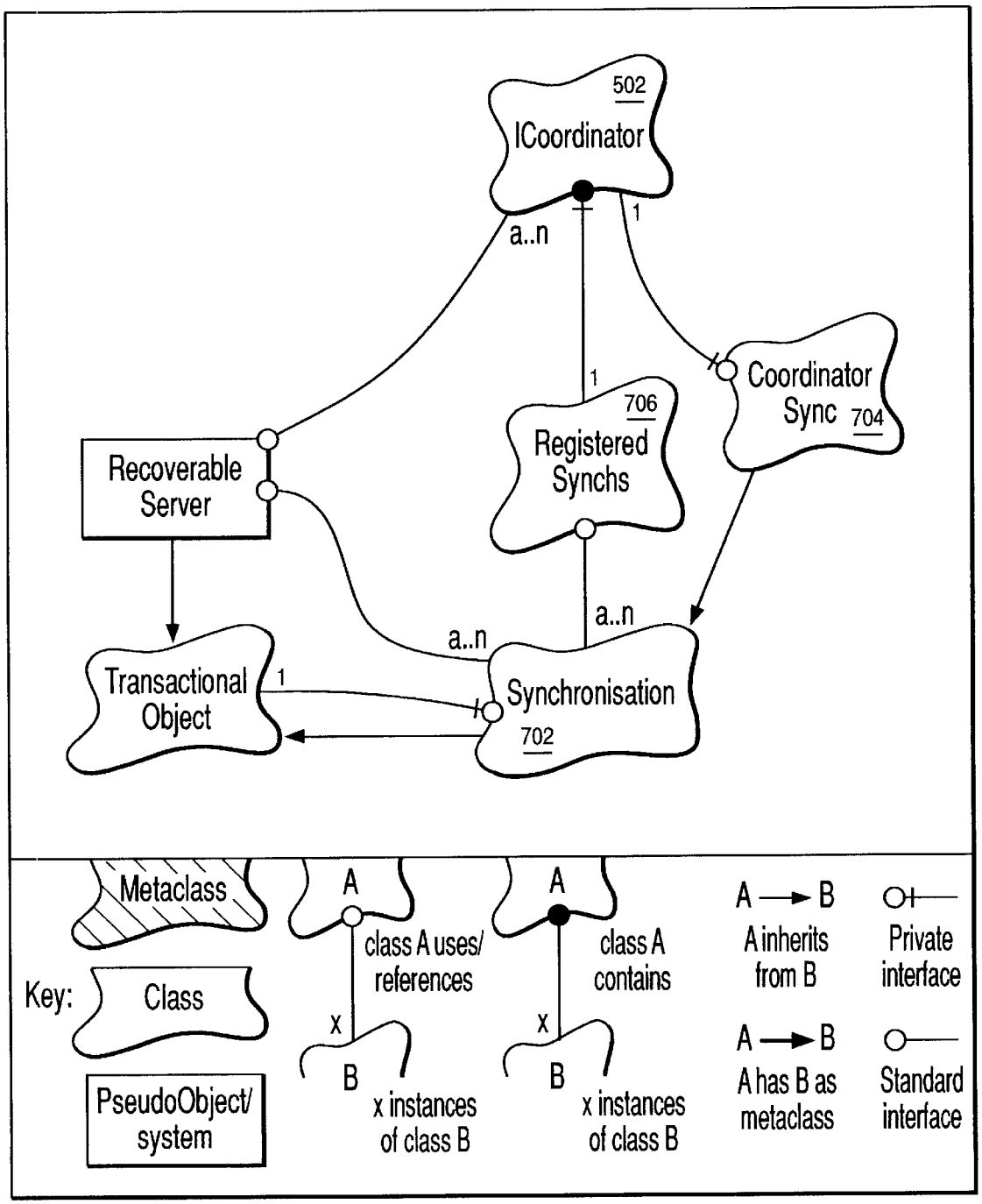
FIG. 7 is an object diagram illustrating the synchronization classes that ensure data synchronization and before and after termination processing of synchronization objects according to the present invention.

FIG. 7 illustrates the synchronization classes used by the preferred embodiment of the present invention to control synchronization of dual-level data stores.

Synchronization class 702 represents those objects ("synchronization objects") that may not be involved in the two-phase commit operations, but want to be informed about the completion of a particular transaction. These objects want to be informed just prior to the completion of a transaction and, in an alternate embodiment, just after completion of the transaction. For objects that have a dual-level store behavior, this allows them to synchronize their state with the data store just prior to completion of the transaction. Synchronization object instances are created by a Transaction Server 124 and inherit from Transactional Object to allow them to access the necessary transaction information.

CoordinatorSync class 704 is responsible for receiving synchronization operations from a superior Coordinator (either a TopCoordinator or SubCoordinator), e.g., 502, and relaying them to the subordinate TopCoordinator or SubCoordinator 602 that registered the CoordinatorSync object for participation in the transaction completion. The CoordinatorSync class 704 inherits from the Synchronization class 702 and is used by the TopCoordinator and SubCoordinator classes 602. It is created by the TopCoordinator or SubCoordinator when it has registered Synchronization objects.

The RegisteredSyncs class 706 records those Synchronization objects (instances of Synchronization class 702) that have been registered with the containing Top/SubCoordinator for synchronization in a transaction. RegisteredSyncs contains any number of Synchronization references which are maintained as a set of unique references. The Synchronization references may include references to CoordinatorSync objects that are in different processing nodes.

The RegisteredSyncs class is responsible for distributing before and after transaction completion messages to the Synchronization objects registered with it when directed to do so by the containing Coordinator during transaction completion. Synchronization objects and CoordinatorSync objects receive the before and after transaction completion messages in the same manner.

The RegisteredSyncs instance is created and destroyed along with the Top/SubCoordinator instance and is contained within the Top/SubCoordinator classes.

The novel structure illustrated in FIG. 7 is used to implement the novel process of the present invention as will be described in greater detail below.

Transaction completion is the process of completing a transaction and either committing or rolling back any changes made by the transaction. Transaction termination is initiated by the Transaction client 122 sending a message to the ICurrent pseudo-object 504 directing it to complete the transaction. The ICurrent object determines the IControl object 506 for the transaction and requests the identity of the ITerminator 508 for the transaction. The ITerminator class manages the two-phase commit processing for a transaction. If there is no current transaction, processing terminates. Otherwise, the completion operation is passed to the ITerminator 508 which passes it to the CoordinatorTerm 604, which, in turn, directs the root TopCoordinator 602 through the two-phase commit protocol. Prior to sending the Prepare message that is phase one of the two-phase commit protocol, the before_completion method is invoked by the CoordinatorTerm 604 on the TopCoordinator 602 of the root transaction. The TopCoordinator 602 informs all relevant objects that have registered their interest in being informed of the impending transaction completion. The RegisteredSyncs object 706 contains all these references and sends the before_completion synchronization message to each which triggers the data synchronization.

Some of the object references contained in the RegisteredSyncs object could be for node CoordinatorSyncs. Sending the message to the CoordinatorSync would then trigger the steps to pass the before_completion synchronization message to each Synchronization object registered with the RegisteredSyncs object for the node in which the CoordinatorSync is running (most often another system in the distributed system network.) This structure (one that includes CoordinatorSyncs) ensures efficient message flow since only one synchronization request is passed between systems even when multiple objects on the other system register to receive the synchronization messages.

Figure 8:
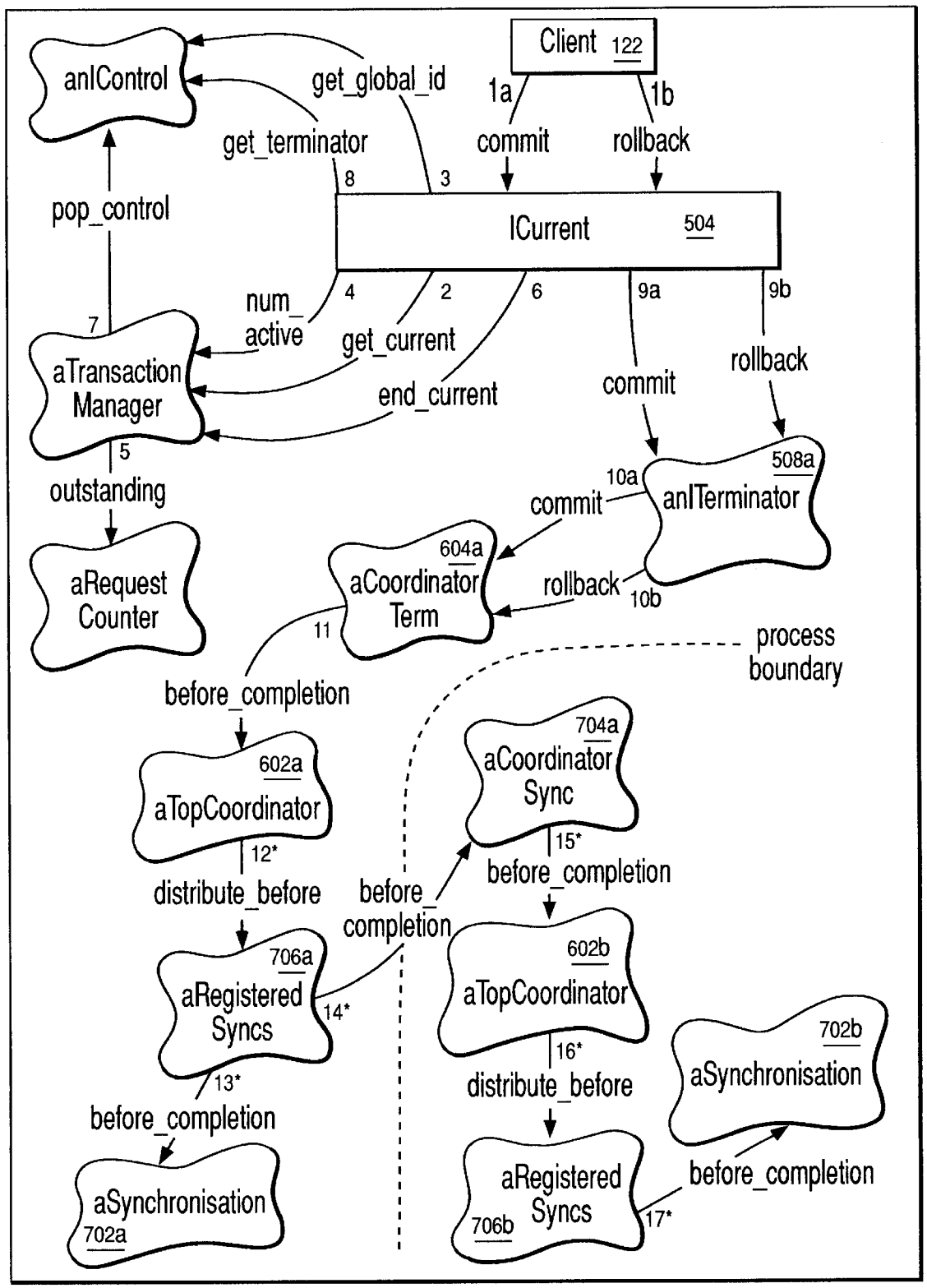
FIG. 8 is an object diagram illustrating the flow of messages between instances of objects according to the process of the present invention.

The message flow is illustrated in greater detail in FIG. 8. Instances of specific classes, e.g., Coordinator Term 604, are indicated by a suffix of a, b, c, etc., e.g., aCoordinatorTerm 604*a*.

Once the transaction has completed, the Coordinator Term causes the Top Coordinator to inform all Registered Synchronization objects that the transaction is complete using the same process described for the before_completion synchronization messages. Once this has been done, all processing relevant to the transaction is complete and the TopCoordinators may be destroyed.

FIG. 8 illustrates the message flow necessary to perform synchronization. The messages are numbered. Only those messages relevant to the present invention will be described.

If the client has asked for a "commit," Coordinator Term 604a invokes TopCoordinator::before_completion 11* on the TopCoordinator reference 602a it has remembered as the root for the transaction. (The form object::message indicates that message is being sent to object for action.) If the root TopCoordinator does not support synchronization, further processing is skipped. The root TopCoordinator 602a informs all registered synchronization objects, e.g., 702a, that the transaction is about to complete by invoking RegisteredSyncs::distribute_before 12*. If there are no synchronization objects, synchronization processing ceases. Otherwise, RegisteredSyncs goes through the set of registered synchronization objects, invoking Synchronization::before_completion 13* on each one.

Objects requiring synchronization that exist on another node are accessed through CoordinatorSync objects. As described earlier, these object references are contained in the set within the RegisteredSyncs object. The RegisteredSyncs 706a object invokes CoordinatorSync::before_completion 14* on those objects that are actually CoordinatorSync objects, though RegisteredSyncs does not actually differentiate between the CoordinatorSyncs and Synchronization objects.

The CoordinatorSync 704a that exists on the other node passes on the synchronization operation to the subordinate TopCoordinator 602b on that node using TopCoordinator::before_completion 15*. The Subordinate TopCoordinator 602b distributes the operation to all Registered Synchronization objects 706b using RegisteredSyncs::distribute_before 16*. RegisteredSyncs 706b invokes Synchronization::before_completion on each of the Synchronization objects 702b in the set 17*.

The ability to register CoordinatorSync objects in the higher level RegisteredSyncs set enables a hierarchical distribution of the completion messages. The steps 14*–17* are repeated throughout the hierarchy to ensure that all registered synchronization objects are notified.

Once the transaction has been terminated through either a commit or rollback, an after_completion process is performed to inform all of the registered synchronization objects of the transaction outcome. This enables the registered objects to take action based on that outcome, for example, to recover data from private storage in case a rollback destroyed needed data. The after_completion process follows steps similar to those illustrated in FIG. 8.

Figure 9:
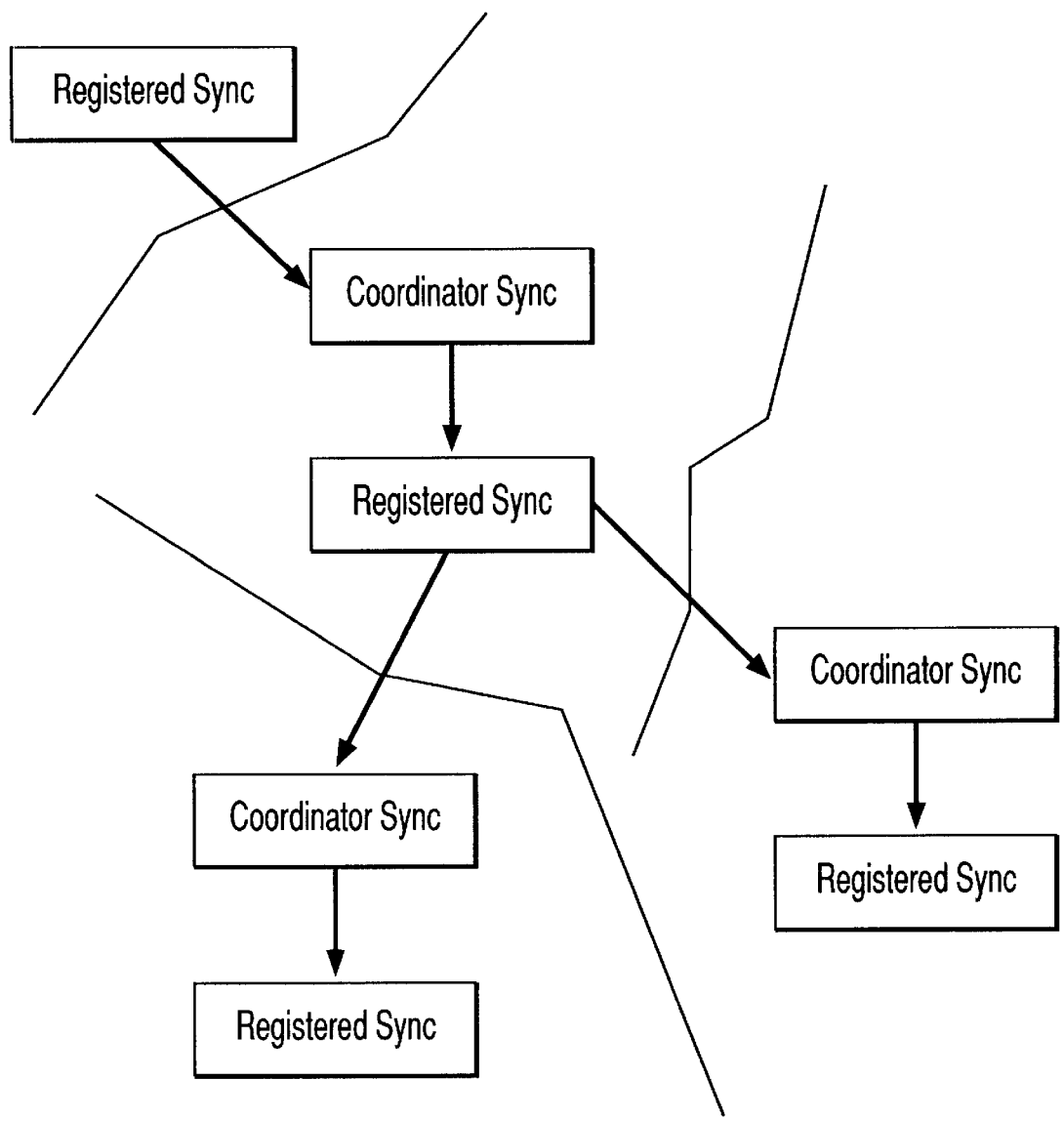
FIG. 9 is a block diagram illustrating the hierarchical arrangement of RegisteredSync and CoordinatorSync objects according to the present invention.

The present invention uses the CoordinatorSync object and RegisteredSync objects to maintain a hierarchical record of Synchronization objects requiring completion notification. The Synchronization interface inherits from the Transactional Object to allow the implementations of the method access to the transaction context. When a Synchronization object moves to a state in which it requires notification of transaction completion, it registers with the RegisteredSyncs object for that node. If the RegisteredSyncs object is not at the root node, it must cause a CoordinatorSync object to register with the superior RegisteredSync. A hierarchy of RegisteredSync and CoordinatorSync objects, is therefore created as shown in FIG. 9. The CoordinatorSync is thus a surrogate constructed at each node. The surrogate is dynamically bound to its superior object only when objects that require synchronization are identified.

Each processing node has at most one CoordinatorSync object. Thus, at most one message is sent from the higher level RegisteredSync object. If no objects at that node require synchronization, then no CoordinatorSync object is added to the hierarchy and no message is sent to that node. Within a node, completion messages are sent only to the Synchronization objects that have registered as needing notification. This ensures that message traffic and the associated overhead is minimized.

Use of the before_completion and after_completion technique solves the problem of ensuring that volatile objects are informed in an efficient manner that a transaction is about to complete. This is done before the two-phase commit completion protocol begins, which ensures that data can be flushed from the objects to the underlying data store before the transaction is completed.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A system for synchronizing volatile transaction processing object data with permanent data in a computer system having a processing node with processor means, memory and permanent storage means, the system comprising:

termination means for controlling transaction processing transaction termination, means for registering with said termination means an object having data requiring synchronization before transaction termination, wherein said object does not otherwise participate in termination processing;

means for notifying only registered objects before transaction completion processing, said means for notifying being responsive to said transaction means and said means for registering a plurality of additional processing nodes each having processor means and memory, and wherein the means for registering includes means for registering at most one object for each additional processing node having an object requiring synchronization; and wherein the means for notifying includes:

means for testing whether an additional processing node has any objects requiring synchronization; and means for sending one and only one notification to each processing node that contains objects requiring synchronization.

* * * * *